Dec. 1, 1953  P. BIELKOWICZ  2,660,775
FASTENING DEVICE
Filed Aug. 30, 1949
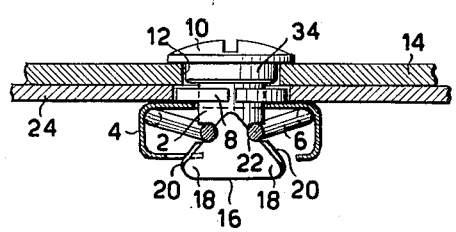
FIG. 1.
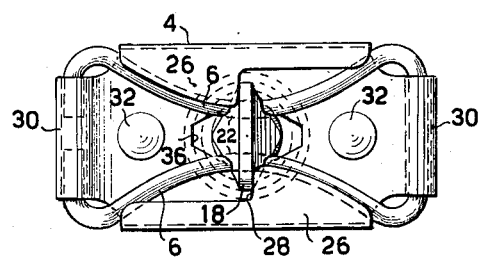
FIG. 2.
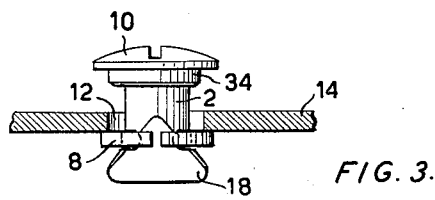
FIG. 3.
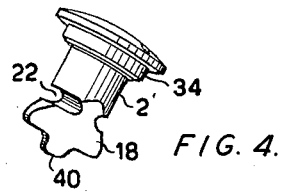
FIG. 4.
FIG. 5.
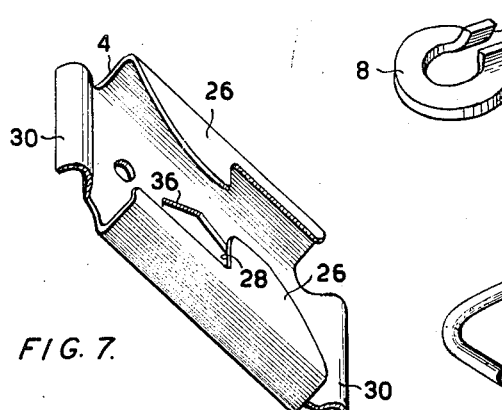
FIG. 7.
FIG. 6.
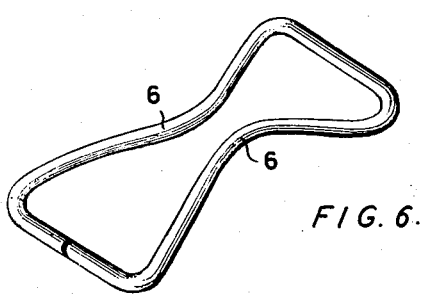
FIG. 8.
INVENTOR.
PIOTR BIELKOWICZ
BY
ATTORNEYS Patented Dec. 1, 1953

2,660,775

UNITED STATES PATENT OFFICE 2,660,775

FASTENING DEVICE

Piotr Bielkowicz, London, England, assignor to
Zbyslaw M. Ciolkosz, Swarthmore, Pa.

Application August 30, 1949, Serial No. 113,219

4 Claims. (Cl. 24—221)

This invention relates to a fastening device of the rotatable stud and spring socket type employed for detachably uniting two parts, generally sheet metal, such as, for example, the cowlings, inspection doors and similar parts of aircraft to the skin structure, and also parts which are subject to loads in various directions and must be easily detachable, such as stressed tank covers, stressed fairings and other elements of the stressed skin structure.

This invention is applicable not only to aircraft parts but also for automotive applications and other applications such as engine cover plates, jet engine covers, instrument panel attachments and the like.

It is an object of this invention to provide a fastener of simple design which is easily assembled and will provide a positive connection capable of transmitting load between members of a structure not only along the axis of the fastener stud but also in a direction perpendicular to the axis of the fastener stud.

It is a further object of the invention to provide a fastener which is easily disconnected when required and which will resist any force tending to unfasten the fastener when it is in locked position.

These and other objects of the invention will become apparent from the following description, read in conjunction with the accompanying drawing, in which:

Figure 1 is a transverse cross-section of a complete fastener in locked position fastening together two sheets of metal;

Figure 2 is a bottom view showing a fastener assembly in locked position;

Figure 3 is a view partly in section showing a stud mounted in a bore in a stud carrying member;

Figure 4 is a perspective view of an alternate form of the fastener stud;

Figure 5 is a perspective view of the stud securing washer;

Figure 6 is a perspective view of a socket member of the fastener;

Figure 7 is a perspective view of the socket retaining plate of the fastener; and Figure 8 is a cross-section of an alternate form of the fastener.

Referring to the figures, the improved fastener includes a stud member 2, a retaining plate 4, spring socket members 6 and a securing washer 8.

The stud member 2 has a head portion 10 having a cross cut or other means by which the stud may be rotated. The stud is mounted in the bore 12 in the stud carrying member 14 so as to be capable of axial and rotary movements in relation thereto. The head portion 10 of the stud is of sufficient diameter to bear upon the surface of the member surrounding the bore 12. The stud is formed at its operative end 16 with wing-like extensions 18 of tapered section reducing in thickness toward the end of the stud and having chamfered side faces 20. The chamfered side faces 20 terminate in the recesses 22 which are adapted to accommodate the spring abutments of the spring socket members 6 which are retained by the retaining plate 4. The recesses 22 are contoured to fit the circular section of the spring member 6 as viewed in Figure 1 and to fit the contoured form of the spring member 6 as viewed in Figure 2.

Figure 6 shows the socket elements 6 which are formed from the socket carrying member 4. As shown in Figure 1 the elements 6 present below aperture 36 therein two oppositely curved lengths of wire spaced together more closely than the maximum thickness of the bevelled operative end 16 of the stud 2. These wire lengths, when the fastener is in locked position, are located in the recesses 22 of the stud 2 and being pulled apart exercise certain pressure against the recesses thus preventing the stud from rotating and disengaging the fastener. The amount of deflection of the socket elements is limited in the horizontal and vertical directions by arcuately spacing the elements with respect to the retaining plate 4 and by arranging the flanges of the retaining plate in such a manner as to limit any excessive movement of the socket element wire.

The retaining plate 4 is affixed to the retaining plate carrying member 24, the plates 14 and 24 comprising the two members to be joined together. The spring abutments of the socket members 6 are enclosed within the inwardly turned flanges 26 of the retaining plate 4. The flanges are formed with mutually opposite lugs 28 disposed at right angles to the center line of the sockets 6 and serve as stops to limit the extent of the angular movement of the winged portions 18 of the stud 2.

The spring socket members 6 are retained by the U-shaped flanged end portions 30 extending from both ends of the retaining plate 4 in such a manner as to locate the socket elements 6 in relation to the plate 4 but, at the same time, to enable the spreading and deflecting of the socket spring when the stud 2 is inserted and rotated. The socket elements 6 are preassembled to the retaining plate 4 and the plate is firmly secured to the element 24 by rivets or bolts 32 or by spot welding or other suitable means.

The securing washer 8 is loosely mounted on stud 2 and, as seen in Figure 1, is located to serve in the transmission of load between the stud carrying member 14 and the member 24. Any side load imparted to the member 14 is taken in bearing on the shoulder 34 of the stud 2 and is then transferred through the stud 2 to the washer 8 which fits into the bore in plate 24.

Any axial load imparted to the stud is taken by the shear resisting spring sockets 6 which, if excessively deflected in the axial direction of the stud, will abut against the retaining plate 4 thus creating in the spring sockets an ability to take a much greater load than can be carried by their spring deflection alone.

Figure 2 shows a bottom view of the fastener assembly with the stud 2 in the secured position and the wings 18 of the stud limited in their angular movement by the stops 28 of the plate 4. The aperture 36 in the retaining plate 4 is elongated or diamond shaped so as to enable the wing portions of the operative end 16 of the stud 2 to pass through the plate when being inserted between the socket members 6. The aperture 36 must be sufficiently narrow, however, to retain the washer 8 when the stud 2 is being moved axially for engagement with the spring socket members. As has been explained, it is necessary that the washer 8 be retained within the bore in the member 24 when the fastener is in locked position.

Figure 3 shows the stud 2, the stud carrying member 14 and the securing washer 8. The bore 12 in the member 14 is of sufficient diameter to enable the winged portions 18 of the stud 2 to pass through the member 14 when slightly tilted and also to provide the stud with certain freedom of angular movement. This freedom of angular movement is important to facilitate insertion or removal of the stud from curved panels. Once assembled with the member 14 the stud 2 is retained and prevented from falling out of the member 14 by the washer 8.

The washer 8 is loosely mounted on stud 2 and is limited in its movement by the shoulder 34 at one end of the stud and by the winged portions 18 at the opposite end of the stud. This in turn enables the stud 2 to change its position in relation to the elements 14 and 24 and to move axially within the bores therethrough. The advantage of the axial movement is that the stud may be inserted for engagement with parts 14 and 24 already abutting each other and that the stud 2 may be forced to pop out by the action of the spring members 6 on the tapered end of the stud when the stud recesses 22 are disengaged from the spring socket members 6.

Figure 5 shows the washer 8 slotted in one place on its circumference with both ends 38 adjoining the slot bent upwardly thus forming a gap sufficiently wide to permit the washer to pass over one of the winged portions of the stud 2 for assembling purposes. The same effect may be obtained by bending one end of the washer upwardly and the other downwardly or by a spirally shaped washer. The stud 2 is first passed through the member 14 and then the washer is placed over the stud. The gap in the washer is then closed by flattening both ends 38 of the washer thus providing a flat washer assembled to the stud as shown in Figure 3. The washer is loosely fitted to the shank of the stud thus permitting the stud freedom of axial movement and still preventing the stud from falling out of the member 14.

When the fastener is in locked position the shoulder 34 of the stud 2 enters the bore 12 of the member 14 and is adapted to provide a relatively snug fit therewith. The most important function of the washer 8 is to transfer bearing load from the stud 2 to the member 24 or vice versa when side load is applied to the device.

Figure 4 shows a stud 2' in an alternate form provided with a centering pin 40. The stud 2' is formed with winged extensions 18, recesses 22 and a shoulder 34 identical to the formation of the stud 2 previously described.

The centering pin 40 may be provided on the operative end of the stud when the assignment of the fastener is to transmit a high degree of loading in the plane of the members 14 and 24. Under such conditions it is important to secure the stud 2' in such a position that the shoulder 34 and the washer 8 abut squarely against the parts 14 and 24, respectively. The centering pin 40 is supported as will be hereinafter described and serves to retain the stud 2' in a position perpendicular with respect to the members 14 and 24.

Figure 8 shows a longitudinal cross-section of the retaining plate 4 and the centering bracket 42 with the centering pin 40 of the stud 2' inserted into the bore 44. The centering bracket 42 may be formed as a separate member and placed between the flanges 26 of the retaining plate 4 and fastened to the plate 4 with the rivets or bolts which are provided to attach the plate to the member 24. The purpose of the centering bracket is to center and support the pin 40 of the stud 2'. The centering pin 40 in the stud operating position enters the bore 44 in the bracket 42 and thus assures that the stud 2' will remain in a vertical position with respect to the members 14 and 24 and, consequently, the proper working conditions will be maintained for the shoulder 34 and the washer 8.

In operation the members 14 and 24 which are to be united are laid over one another and then the bevelled end 16 of the stud 2 is pressed axially between the oppositely curved spring wires 6 forcing them apart, whereafter the stud 2 is rotated to cause the wings 18 of its operative end 16 to ride over the wires 6 and to compress the arcuate spring elements toward the plate 4 upon which they are mounted, forcing the wires 6 into the radiused recesses 22 in the stud 2 thus rigidly clamping the two parts 14 and 24 together. Upon reverse rotation being imparted to the stud 2, the stud is rejected from engagement with the socket members 6.

An important advantage of this invention is that, due to the freedom of motion of the stud 2, it is not necessary that the stud be withdrawn from the fastener at right angles to the panels or surfaces being joined together. Therefore, the fastener may be suitably applied to joining together curved surfaces.

It will be obvious that the fastener may be employed to join together more than two surfaces and that the thicknesses of the shoulder 34 and the retaining washer 8 may be modified to adapt the fastener to join together groups of panels varying in both number and thickness. These and other modifications may be made to the fastener disclosed herein without departing from the invention as defined in the following claims.

What is claimed is:

1. A fastening device for securing two parts together comprising a stud mounted in an opening in one of said parts to be secured together, having freedom of axial and rotary motion therewith and having a head portion adapted to bear thereagainst, retaining means secured to the other of said parts to be secured together, and opposed resilient elements adapted to be retained by said retaining means, said resilient elements comprising a pair of arcuately formed spring abutments disposed with the end portions of the arcuate formations spaced apart from each other and engaged by the retaining means and with the center portions of the arcuate formations curved toward each other and rising away from said parts to be secured together, and said stud having wing-like extensions at its outer end opposite said head portion, said extensions and the end of the stud in the region thereof being of tapered section reducing in thickness toward the outer end of the stud and providing a pair of opposed plane wedge-forming surfaces, said extensions having chamfered side faces extending between said wedge-forming surfaces, the chamfered side faces of said extensions each terminating in a recess extending between the opposed wedge-forming surfaces immediately adjacent to the inner ends of the wedge-forming surfaces, said wedge-forming surfaces at their inner ends providing a wedge of thickness greater than the spacing of said opposed resilient elements, so as on receiving axial movement to separate said resilient elements and on receiving rotary movement to engage said resilient elements within said recesses.

2. A fastening device for securing two parts together comprising a stud mounted in an opening in one of said parts to be secured together, having freedom of axial and rotary motion therewith and having a head portion adapted to bear thereagainst, retaining means secured to the other of said parts to be secured together, and opposed resilient elements adapted to be retained by said retaining means, said resilient elements comprising a pair of arcuately formed wire spring abutments disposed with the end portions of the arcuate formations spaced apart from each other and engaged by the retaining means and with the center portions of the arcuate formations curved toward each other and rising away from said parts to be secured together, and said stud having wing-like extensions at its outer end opposite said head portion, said extensions and the end of the stud in the region thereof being of tapered section reducing in thickness toward the outer end of the stud and providing a pair of opposed plane wedge-forming surfaces, said extensions having chamfered side faces extending between said wedge-forming surfaces, the chamfered side faces of said extensions each terminating in a recess extending between the opposed wedge-forming surfaces immediately adjacent to the inner ends of the wedge-forming surfaces, said wedge-forming surfaces at their inner ends providing a wedge of thickness greater than the spacing of said opposed resilient elements, so as on receiving axial movement to separate said resilient elements and on receiving rotary movement to engage said resilient elements within said recesses.

3. A fastening device for securing two parts together comprising a stud mounted in an opening in one of said parts to be secured together, having freedom of axial and rotary motion therewith and having a head portion adapted to bear thereagainst, retaining means secured to the other of said parts to be secured together, and opposed resilient elements adapted to be retained by said retaining means, said resilient elements comprising a pair of arcuately formed spring abutments disposed with the end portions of the arcuate formations spaced apart from each other and longitudinally rigidly positioned by said retaining means, and with the center portions of the arcuate formations curved toward each other and rising away from said parts to be secured together, and said stud having a shank portion having recesses for engagement with said resilient elements.

4. A fastening device for securing two parts together comprising a stud mounted in an opening in one of said parts to be secured together, having freedom of axial and rotary motion therewith and having a head portion adapted to bear thereagainst, retaining means secured to the other of said parts to be secured together, and opposed resilient elements adapted to be retained by said retaining means, said resilient elements comprising a pair of arcuately formed spring abutments disposed with the end portions of the arcuate formations spaced apart from each other and longitudinally rigidly positioned by said retaining means, and with the center portions of the arcuate formations curved toward each other and rising away from said parts to be secured together, and said stud having wing-like extensions at its outer end opposite said head portion, said extensions and the end of the stud in the region thereof being of tapered section reducing in thickness toward the outer end of the stud and providing a pair of opposed plane wedge-forming surfaces, said extensions having chamfered side faces extending between said wedge-forming surfaces, the chamfered side faces of said extensions each terminating in a recess extending between the opposed wedge-forming surfaces immediately adjacent to the inner ends of the wedge-forming surfaces, said wedge-forming surfaces at their inner ends providing a wedge of thickness greater than the spacing of said opposed resilient elements, so as on receiving axial movement to separate said resilient elements and on receiving rotary movement to engage said resilient elements within said recesses.

PIOTR BIELKOWICZ.

References Cited in the file of this patent

UNITED STATES PATENTS

| Number | Name | Date |
| --- | --- | --- |
| 306,780 | Schreiber | Oct. 21, 1884 |
| 2,110,435 | Albin | Mar. 8, 1938 |
| 2,186,747 | Albin | Jan. 9, 1940 |
| 2,258,668 | Zahodiakin | Oct. 14, 1941 |
| 2,285,661 | Hryzack | June 9, 1942 |
| 2,314,470 | Warren | Mar. 23, 1943 |
| 2,325,699 | Moran | Aug. 3, 1943 |
| 2,341,575 | Segal | Feb. 15, 1944 |
| 2,364,906 | Lumsden | Dec. 12, 1944 |
| 2,444,040 | Gower | June 29, 1948 |
| 2,492,113 | Rees | Dec. 20, 1949 |

OTHER REFERENCES

Ser. No. 447,499, Von Opel (A. P. C.), published June 1, 1943.